United States Patent [19]

Sato et al.

[11] 4,216,509
[45] Aug. 5, 1980

[54] CASSETTE PLAYER/RECORDER INTERCHANGEABLY HANDLING CASSETTES OF TWO SIZES

[75] Inventors: Masaaki Sato; Shinichi Saito, both of Hachioji, Japan

[73] Assignee: Olympus Optical Co., Ltd., Tokyo, Japan

[21] Appl. No.: 948,217

[22] Filed: Oct. 3, 1978

[30] Foreign Application Priority Data

Oct. 4, 1977 [JP]  Japan ................................ 52-119293

[51] Int. Cl.² ........................ G11B 15/18; G11B 15/24
[52] U.S. Cl. ..................................................... 360/94
[58] Field of Search ......................................... 360/94

[56] References Cited

U.S. PATENT DOCUMENTS

| | | | |
|---|---|---|---|
| 3,594,008 | 7/1971 | Takagi | 360/94 |
| 3,703,295 | 11/1972 | Yamamoto et al. | 360/94 |
| 3,964,099 | 6/1976 | Sato | 360/94 |
| 4,072,992 | 2/1978 | Leshik | 360/94 |

Primary Examiner—Robert S. Tupper
Attorney, Agent, or Firm—Toren, McGeady and Stanger

[57] ABSTRACT

A cassette type magnetic recording and reproducing device comprises a housing, a cassette receiving portion provided therein, at least one magnetic head and pinch roller provided at least at the same position in the cassette receiving portion, a first pair of drive shafts for a small tape cassette provided in the cassette receiving portion, and a second pair of drive shafts for a large tape cassette provided in the same cassette receiving portion.

1 Claim, 8 Drawing Figures

CASSETTE PLAYER/RECORDER INTERCHANGEABLY HANDLING CASSETTES OF TWO SIZES

BACKGROUND OF THE INVENTION

The present invention relates to a cassette type magnetic recording and reproducing device usable by separately individually mounting large and small cassettes in the same cassette receiving portion.

It is not unusual to find that two types of cassettes are often in use, these being a so-called compact cassette, and a smaller microcassette.

These two types of cassettes, however, cannot be used in one tape recorder because of differences in their structure and size.

Therefore, as shown in Japanese Utility Model Application Publication No. 22,573/72, a smaller cassette has a hub space, head insertion and the like having the same sizes as those of a larger cassette, and a portion for inserting a tape is made small.

In this case, two large and small cassettes can be used in one tape recorder, but the small cassette cannot be made too small as compared with the large cassette, and with such a comparatively large size, a space between a hub and an outer wall is too narrow to wind a large amount of tapes therearound.

SUMMARY OF THE INVENTION

An object of the present invention is to eliminate the above described drawbacks.

Another object of the present invention is to provide a cassette type magnetic recording and reproducing device for using a very small cassette and a normal large cassette in the same receiving portion, which is simple in construction and excellent in exchangeability.

According to the present invention a cassette type magnetic recording and reproducing device comprises a housing, a cassette receiving portion provided therein, at least one magnetic head and pinch roller provided at least at the same position in the cassette charging portion, a first pair of drive shafts for a small tape cassette provided in the cassette receiving portion, and a second pair of drive shafts for a large tape cassette provided in the same cassette receiving portion. In case of mounting the small tape cassette on the first drive shafts these drive shafts are provided apart from the second drive shafts for the large tape cassette in order not to come into contact with each other. The first drive shafts for the small tape cassette are provided to be movable under the bottom surface of the cassette seeing portion.

DESCRIPTION OF THE PREFERRED EMBODIMENT

Figure 1:
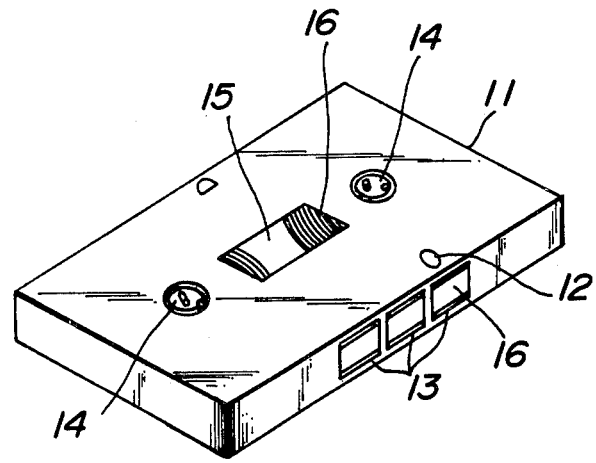
FIG. 1 is a perspective view showing a large cassette used for a magnetic tape recorder according to the present invention.
Figure 2:
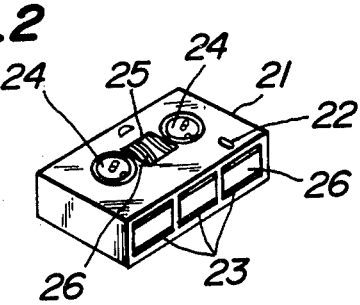
FIG. 2 is a perspective view showing a small cassette used for the tape recorder according to the present invention.

Referring now to the drawings, wherein same reference characters designate same or corresponding parts throughout the several views, FIGS. 1 and 2 show a large cassette 11 and a small cassette 21 used for a magnetic recording and reproducing device according to the present invention. A capstan shaft insertion hole 12 and a pinch roller and a magnetic head insertion windows 13 of the large cassette 11 are formed into almost the same arrangement and size as those of a capstan shaft insertion hole 22 and a pinch roller and a magnetic head insertion windows 23 of the small cassette 21.

The large cassette 11 is provided with a pair of tape hubs 14 engaged with the drive shaft at a predetermined position, an observation window 15 is provided between the hubs 14, and a magnetic tape 16 is observed from this window 15.

On the other hand, the small cassette 21 is also provided with a pair of tape hubs 24 narrower than the large cassette 11 in width and an observation window 25 provided therebetween and a magnetic tape 26 observed from this window 25.

Figure 3:
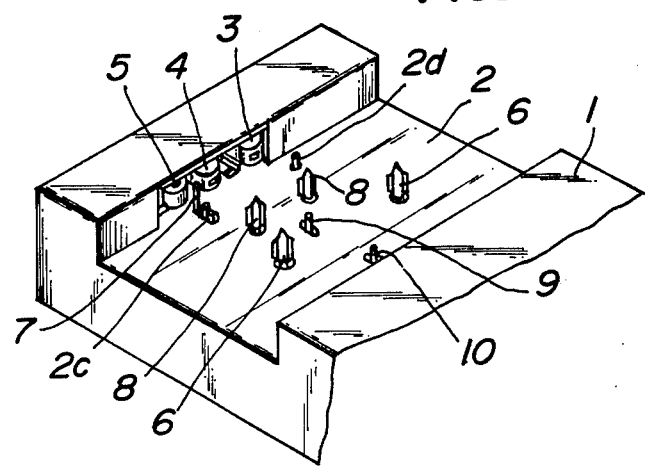
FIG. 3 is a partially perspective view showing a cassette charging portion of the magnetic recording and reproducing device according to the present invention.

A cassette receiving portion 2 of a magnetic recording and reproducing device 1 for use with such cassettes 11, 21 having different gaps of the tape hubs 14, 24, as shown in FIG. 3, is provided with magnetic heads 3, 4 and pinch roller 5 which are positioned at portions coresponding to the insertion windows 13, 23 of the cassette 11, 21, so as to move back and forth, if necessary.

The cassette receiving portion 2 is formed large enough to receive the large cassette 11, and at the center thereof are provided a pair of drive shafts 6 for the large cassette 11.

Further, a capstan shaft 7 is projected at a predetermined position opposite to the pinch roller 5.

On the other hand, a drive shaft 8 for the small cassette 21 provided between the drive shaft 6 and the head and pinch roller are capable of being retracted or lowered.

Figure 5A:
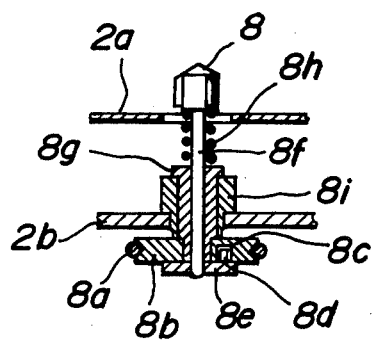
FIGS. 5A, 5B, 6A, and 6B are enlarged fragmentary sectional views showing the essential parts of a driving section of the device according to the present invention.

That is, as shown in FIGS. 5A and B, the drive shaft 8 for the small cassette 21 in integrally fixed with a stop plate 8e having a drive transmission pin 8d engaged with an engage hole 8c bored in a pulley 8b driven by, for instance, a belt 8a, through a coupling shaft 8f.

The above coupling shaft 8f is slidable within a pulley shaft 8g and the drive shaft 8 is projected from the bottom surface 2a in the cassette receiving portion by means of a spring 8h provided between the drive shaft 8 and the pulley shaft 8g.

Reference numeral 8i is a bearing of the pulley shaft 8g secured to a chassis 2b.

Figure 6A:
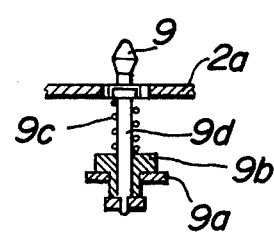

The drive shaft 8 is formed to be lowered from the bottom surface 2a of the cassette receiving portion, while a press pin 9 for pressing the cassette 21 to heads 3, 4 is also lowered from the bottom surface 2a of the cassette receiving portion as shown in FIGS. 6 A and B.

That is, the press pin 9 is secured to a shaft 9d freely provided in a lever 9a having pressing force in the direction of the head through the bearing 9b and the spring 9c.

In the thus formed cassette receiving portion 2 there is further projected a press pin 10 for the large cassette at a predetermined position. Further, one guide pin 2c for positioning the cassette position is projected adjacent to the rear of the capstan shaft 7 and the other guide pin 2d is projected in parallel to drive shafts 6, 8.

The pair of guide pins 2c, 2d are naturally provided in common to the large cassette 11 and the small cassette 21.

Figure 4:
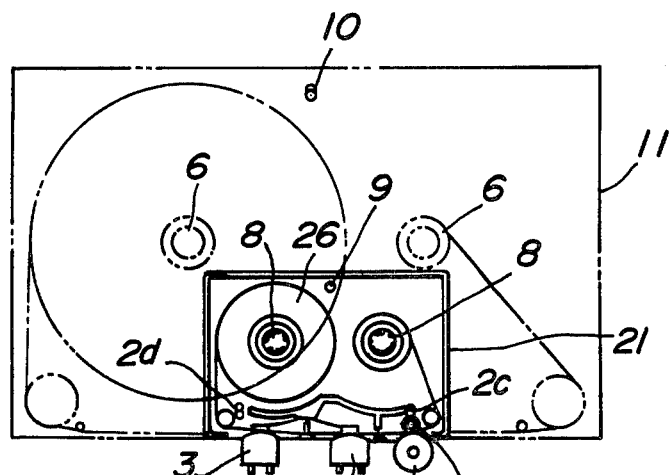
FIG. 4 is an explanatory view showing two kinds of cassette charge in the same cassette charging portion.

In case of mounting the large and small cassettes 11, 21 in the cassette receiving portion 2 of the thus constructed magnetic recording and reproducing device 1, as shown in FIG. 4, the cassette 21 may be mounted in engagement with the drive shaft 8 thereby pressing the cassette 21 to the pair of guide pins 2c, 2d by means of the press pin 9 for holding the cassette in a predetermined desired position. In this case, the small cassette 21 is not brought into contact with the drive shaft 6 of the large cassette 11.

Figure 5B:
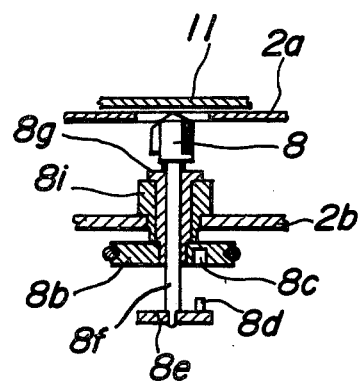
Figure 6B:
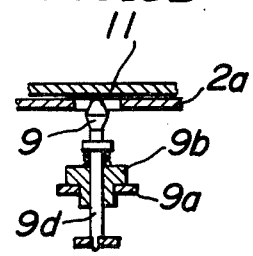

On the other hand, in case of mounting the large cassette 11, the drive shaft 8 and the press guide pin 9 for the small cassette are lowered by the lower surface of the large casette 11 on the outer surface of the large cassette as shown in FIGS. 5B and 6B, so that the large cassette 11 is pressed to the guide pins 2c, 2d by the press pin 10 and held in a predetermined position.

Thereafter, the device is used by operating an operation button (not shown).

In this case, the drive shaft 8 for the small cassette is not rotated even if the pulley 8b is rotated as shown in FIG. 5B, becuase the drive transmission pin 8d provided in the stop plate 8e is released.

In case of mounting large and small cassettes in one cassette receiving portion, the drive shaft and the press pin for the small cassette are able to be lowered, so that in case of charging the large cassette, the shaft and pin are lowered by the outer surface of the large cassette and both the cassettes can easily be used.

In domestic use, therefore, recording and reproducing are performed with the large cassette, while for travel or the like, a handy portable small tape recorder is provided for recording the small cassette and the recorded tape is advantageously reproduced by the device according to the present invention.

In the case of using these two large and small cassettes for, for instance, a video tape recorder, the large cassette is used for a home video tape recorder indoors, and the small cassette is used as a portable video camera such as an 8 m/m or 16 m/m camera outdoors and reproduced with the use of a fixed home video tape recorder at home. As a result, both the cassettes can be used in accordance with need.

In addition, this invention is not limited to the above embodiment, and as a means of transmitting driving power of the drive shaft and the pulley for the small cassette, a frictional plate or clutch is used instead of a pin and the same function and effect are exhibited. Further, the cassette can be used on both sides by being reversed or a tape can be transferred in only one direction such as in a video cassette.

As described above in detail, according to the present invention, large and small cassettes may used in one magnetic recording and reproducing device, and its construction is simple, reliable and easy. Thus, the present invention provides an excellent cassette type magnetic recording and reproducing device.

What is claimed is:

1. A magnetic tape player-recorder particularly suited for interchangeably operating with a first type tape cassette of a smaller size and a second type tape cassette of a size larger than said first type tape cassette, said player-recorder comprising: a housing; means defining a cassette receiving portion in said housing for mounting in operative engagement therein either of said first and said second type tape cassettes; at least one magnetic head and pinch roller provided in a position relative to said cassette receiving portion for operative engagement with either of a first and said second type tape cassette mounted therein; a first pair of drive shafts extending into said cassette receiving portion for operative engagement with a first type tape cassette mounted therein; a second pair of drive shafts located to extend into said cassette receiving portion for operative engagement with a second type tape cassette mounted therein; said second pair of drive shafts being located so as not to interfere with operative mounting of said first type tape cassette in said cassette receiving portion; and means for driving said first pair drive shafts and for permitting said first pair of drive shafts to be moved to a retracted position outside said cassette receiving portion by a second type tape cassette when said second type tape cassette is mounted therein, said driving means including means for disengaging said first pair of drive shafts from driven engagement when in said retracted position.

* * * * *